United States Patent [19]

Fournier et al.

[11] 4,020,860
[45] May 3, 1977

[54] DEVICE FOR DISSIPATING THE ACCIDENTAL OVER-PRESSURE OF A FLUID

[75] Inventors: Jacques Fournier, Lyon; Edmond Thuries, Pusignan, both of France

[73] Assignee: Delle-Alsthom, Villeurbanne, France

[22] Filed: Apr. 3, 1975

[21] Appl. No.: 564,976

[30] Foreign Application Priority Data

Apr. 26, 1974 France ................................ 74.14706

[52] U.S. Cl. .............................. 137/69; 220/89 A; 251/75
[51] Int. Cl.² ........................................ F16K 17/40
[58] Field of Search ............................ 137/68–71; 220/89 A; 251/75

[56] References Cited
UNITED STATES PATENTS

| 1,248,578 | 12/1917 | Vuilleumier ........................ 137/69 |
| 2,154,827 | 4/1939 | Von Wangenheim ............... 137/69 |
| 2,306,029 | 12/1942 | Salzer ............................. 251/75 X |
| 3,608,569 | 9/1971 | Burns ................................. 137/69 |

Primary Examiner—Martin P. Schwadron
Assistant Examiner—Richard Gerard
Attorney, Agent, or Firm—Sughrue, Rothwell, Mion, Zinn & Macpeak

[57] ABSTRACT

A device for dissipating the accidental over-pressure of a fluid contained in an enclosure provided with a sealing membrane intended to be deformed and broken by the over-pressure comprises a mobile piston applied against the membrane subjected to the action of a spring by means of an overcenter spring mechanism having a threshold of balance which, when exceeded, causes the sudden releasing of the piston and the breaking of the membrane, the threshold being reached by the movement of the piston under the action of the deforming of the membrane. The invention applies to the protection of the enclosures under fluid pressure.

3 Claims, 3 Drawing Figures

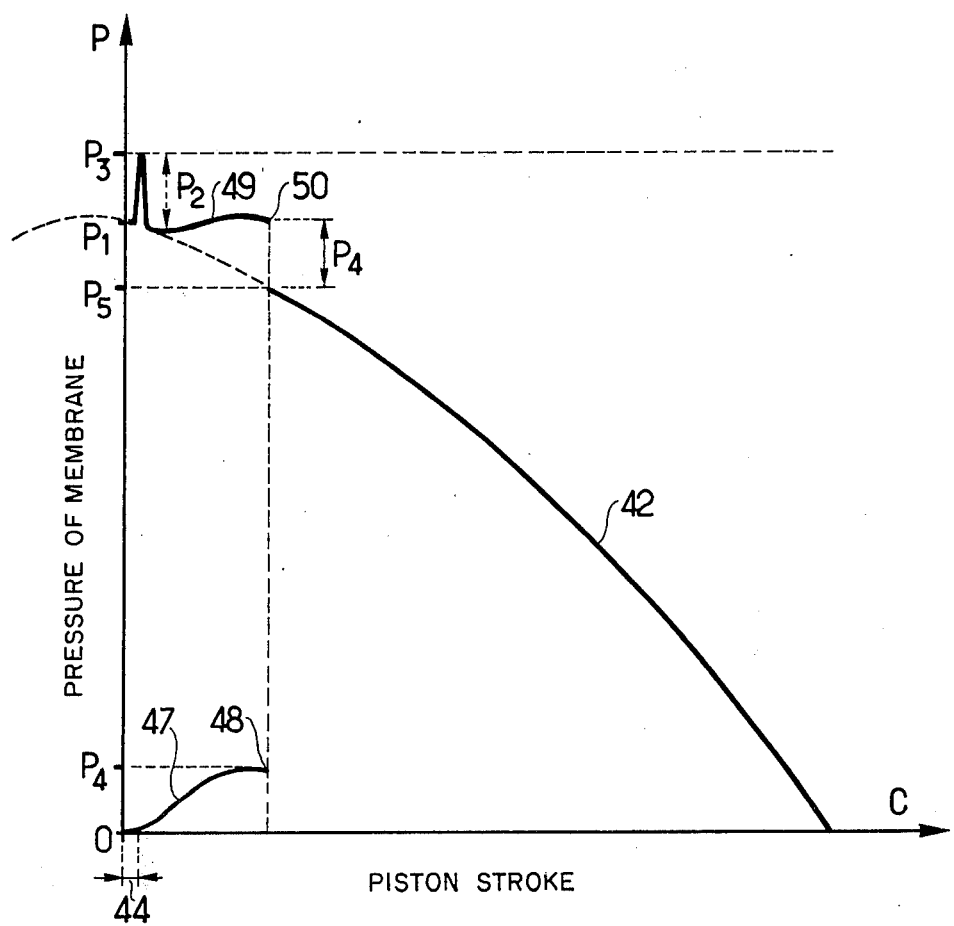

DEVICE FOR DISSIPATING THE ACCIDENTAL OVER-PRESSURE OF A FLUID

BACKGROUND OF THE INVENTION

1. Field of the Invention

The invention concerns devices for dissipating the accidental over-pressure of fluids contained in an enclosure under pressure.

2. Description of the Prior Art

Most of these devices are constituted either by tearable membranes or capsules, or by valves whose closure is applied against a seat by means of a calibrating spring. But the operation of such devices does not make it possible to obtain simultaneously an accurate adjustment of the operation threshold nor to fix that threshold with a slight difference with respect to the normal operating pressure, nor to ensure clear operation once that threshold is reached.

The aim of the invention is a device enabling the obtaining of a very slight difference between the pressure of the fluid for which the fluid-tight sealing of the enclosure is ensured and a pressure which may be adjusted very accurately and corresponding to the removing of the pressure fluid at over-pressure.

SUMMARY OF THE INVENTION

The invention has as its object a device for dissipating the accidental over-pressure of a fluid, contained in an enclosure provided with a fluid-tight membrane provided for sliding between a pair of compression fixing surfaces for one peripheral portion or for being broken by the over-pressure, characterized in that it comprises a mobile piston, applied against the membrane and subjected to the action of a spring by means of a mechanism having a threshold of balance which, when exceeded, causes the sudden releasing of the piston and the sliding release of the membrane or the breaking thereof, the said threshold being reached by the movement of the piston under the effect of the pressure.

According to one characteristic, an overcenter spring mechanism comprises a set of connecting rods and levers arranged between the spring and the piston.

According to another characteristic, the overcenter spring mechanism is constituted by a ball and socket joint and the threshold of balance corresponds to the dead centre of the ball and socket joint.

According to another characteristic, the mechanism comprises a breaking part and the threshold of balance corresponds to the position of the piston causing the breaking of that part.

The characteristics and advantages of the device according to the invention will become apparent from the description of the examples of embodiment illustrated in the drawings.

BRIEF DESCRIPTION OF THE DRAWINGS

FIG. 3 is a diagram explaining the operation of the device according to FIG. 2.

DESCRIPTION OF THE PREFERRED EMBODIMENTS

Figure 1:
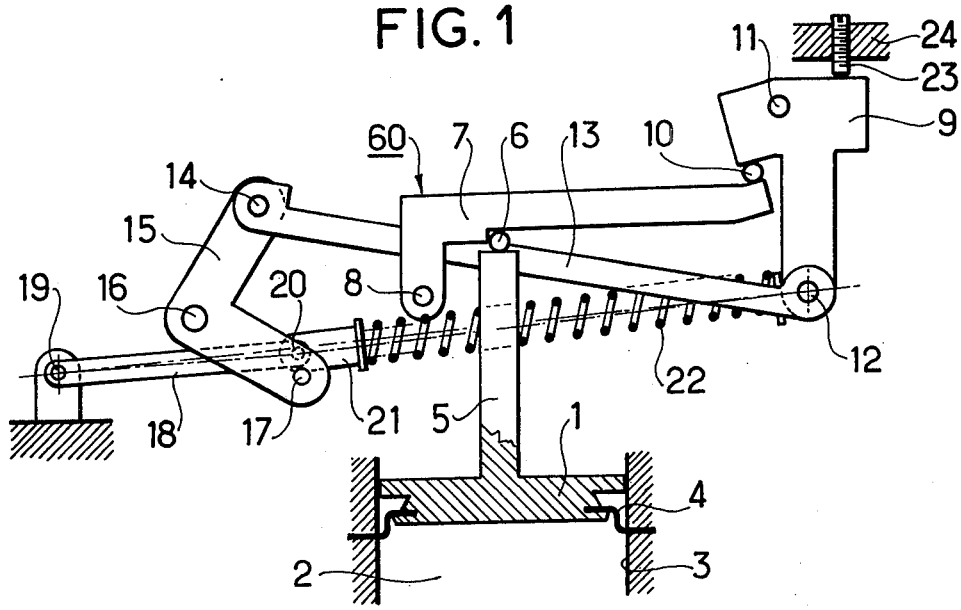
FIG. 1 is a diagrammatic partly cut-away view of a first device according to the invention.

The device according to FIG. 1 comprises a piston 1 affected by the pressure of a fluid in a tank 2; the piston can move slightly in a cylinder 3 fast with the tank. Fluid-tight sealing is provided by a membrane 4 fixed simultaneously to the piston 1 and to the cylinder 3. The piston 1 is fast with a vertical rod 5 which, through a roller 6, is operatively associated with an overcenter spring mechanism 60 subjected to the action of a compression spring 22. The roller 6 is thus brought into contact with a lever 7 moving about an axis 8.

Moreover, the lever 7 is in contact with a lever 9 through a roller 10. The lever 9 can turn about an axis 11 and is articulated at 12 on a connecting rod 13, itself articulated at 14 on a lever 15 moving about an axle 16. The lower arm of the lever 15 comprises an unlocking pin 17 on which a part 18 bears. The latter can turn about a fixed axle 19 and is articulated at 20 on a support 21 of the compression spring 22. The second end of the spring 22 is articulated at 12 on the lever 9. In the rest position, the effort pressing the part 18 on the axle 17 is due to the action of the spring 22, which holds the articulation 20 of the ball and socket joint, constituted by the part 18, the spring 22 and its support 21, below the straight line connecting the axles 12 and 19, to form an overcenter spring mechanism. The movement of the screw 23, in the fixed support 24 enables the adjusting of the device in the rest position.

Operation is as follows:

When the pressure of the tank 2 is equal to the normal operation pressure, the device is held in the rest position corresponding to FIG. 1 by the balance between on the one hand, the effort due to the action of the pressure on the lower face of the piston 1 and, on the other hand, by the effort exerted on its upper face by the spring 22 on the rod 5 through the mechanism (60). Fluid-tight sealing is provided by the membrane 4.

If the pressure of the tank increases and reaches the pressure provided for the dissipating of the over-pressure, the piston 1 moves upwards. That movement causes simultaneously a rotation of the lever 7 about the axis 8 in a counterclockwise direction and a rotation, in the opposite direction, of the part 9 about the axle 11. The movement of the articulation 12 of the lever 9 is very much greater than that of the rod fast with the piston 1 subsequent to the amplification due to the ratios between the lever arms of the parts 7 and 9. The movements of the articulation 12 and the connecting rod 13 towards the left cause the rotating of the lever 15 about the axle 16, an upward movement of the unlocking pin 17 and a rotating of the part 18 about the axis 19. When the articulation 20 of the ball and socket joint has exceeded a threshold corresponding to the alignment of the axles 12 and 19, a position which constitutes its dead centre, the spring 22 is released suddenly and the articulation 12 moves towards the left. The rotating of the part 9 in a clockwise direction and of the lever 7 in the reverse direction cancel the effort directed downwards and exerted on the rod 5 and the piston 1. Under the action of the pressure of the tank, the piston 1 moves upwards and the membrane slides between a pair of opposed compression fixing surfaces for one peripheral portion or tears, this enabling the fluid to escape from the tank 2.

The screw 23 enables, in the rest position, a very accurate adjusting of the value of the dissipation pressure.

Figure 2:
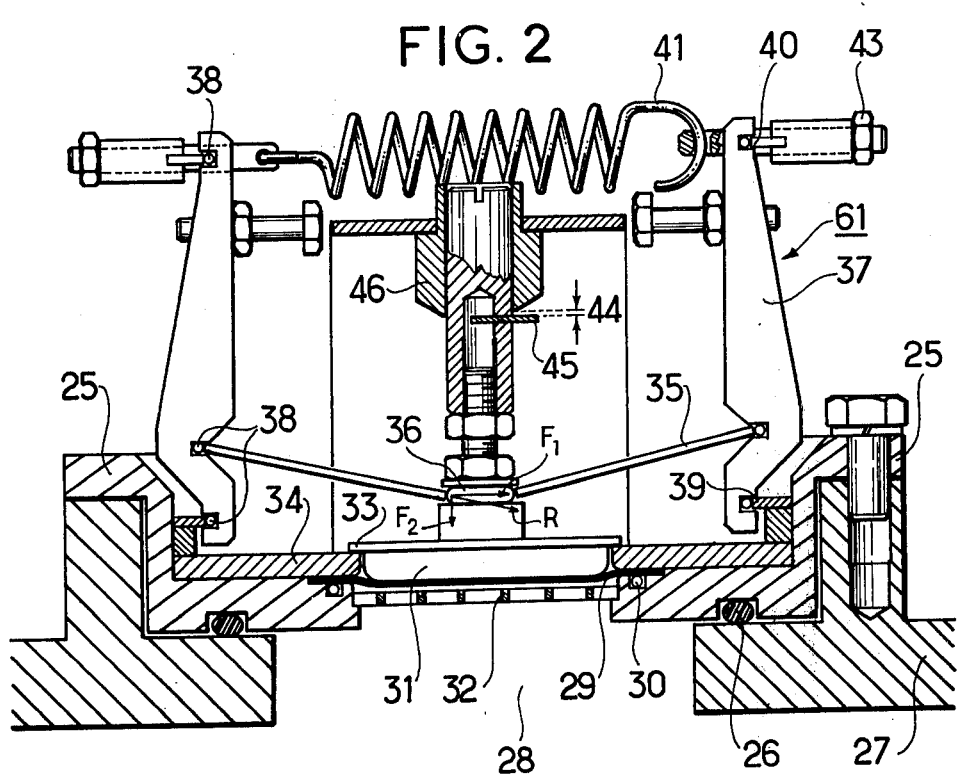
FIG. 2 is a diagrammatic partly cut-away view of a variant of the device according to the invention.

FIG. 2 shows a variant of the device according to the invention. The latter is fixed on a support 25 installed in a fluid-tight manner, by means of the seal 26, on a tank 27 containing a fluid under pressure. Fluid-tight sealing between the fluid under pressure and the outside atmosphere is ensured by a membrane 29 which is very easily deformable and installed in a fluid-tight manner by means of the seal 30. The pressure of the fluid, which the membrane 29 alone would be unable to bear, applies the latter against the piston 31.

If a vacuum is contingently set up in the tank 27 (for example to extract from the tank a gas such as sulphur hexafluoride), a grating 32 supports the membrane. The thrust exerted by the pressure on the piston 31 is supported by an overcenter spring mechanism comprising one or several springs which hold the edge 33 of the piston pressed against the ring 34 fixing the membrane on the support 25.

The overcenter spring mechanism is symmetrical. It comprises two link arms 35 pressing, on the one hand, on a toroidal washer 36 fast with the piston 31 and, on the other hand, on two levers 37 through rollers 38. One end of the levers 37 bears at 39 against the fixed part and the other end 40 is subjected to the action of the spring(s) 41. All the articulations at 38, 39, 40 are formed by means of steel rollers, in order to reduce friction.

The effort of the spring(s) 41 is applied simultaneously to the two levers 37 and is transmitted by these latter to the link arms 35. The resultant R of the forces, directed along the axis of each link arm, may be decomposed into two components, the one F1 being horizontal and the other F2 being vertical, directed downwards. The two components F1, which are equal and in opposite directions, cancel each other out. The two vertical components F2 are added together and the resulting effort is opposed to the action of the pressure of the fluid 28 on the piston 31. When the effort due to the pressure excedds 2 F2, the piston 31 moves upwards, the obliqueness of the link arms 35 decreases and the vertical components F2 also decrease. These components are cancelled out when the link arms become perpendicular to the axis, the device forming an overcenter mechanism. For an upward movement, the resisting effort 2 F2, transmitted by the mechanism, decreases as a function of the stroke C as shown by the curve 42 in FIG. 3, which shows, in the abscissae the stroke C of the movement of the piston 31 and, in the ordinates, the pressure P exerted by the membrane on the mechanism. In FIG. 3, the dotted extension line of solid line 42 which appears to the left of the ordinate line of the plot represents the resisting effort 2 F2 of the overcenter spring mechanism, that resisting effort having reached its maximum point just prior to the piston reaching a center point with respect to the overcenter mechanism where breaking of breaking part 45 occurs at pressure $P_3$, the dotted line extension of solid line 42 to the right of the ordinate vertical line of the plot indicating a continuing decreasing resisting effort on the part of the overcenter mechanism as the piston continues to move upwardly within the fixed guide 46, past the center position where link arms 35 are perpendicular to the piston, as the link arms 35 move past the threshold or center position the spring 41 relaxes and the biasing force exerted by that spring decreases, as evidenced by solid line 42. In these conditions, when the pressure P reaches the value corresponding to the point of starting movement of the piston by the overcenter mechanism moving past center, the speed of the latter has a tendency to increase, since the motor effort on the piston due to the fluid pressure is constant and the resisting effort due to the spring decreases as soon as the device moves past dead center The pressure P1 which causes the piston to initially move is adjusted accurately by manipulating the screw 43 ensuring the tension of the spring 41.

The resisting effort necessary for making the membrane 29 slide or to tear increases with the stroke of the piston along the curve 47 in FIG. 3. The sliding release or the tearing of the membrane alone (in the absence of the breaking part or overcenter mechanism acting thereon) corresponds to the point 48 of the curve 47 and to a pressure P4. The sum of the ordinates, of the characteristics 42 of the spring and of the characteristic 47 of the membrane corresponds to the curve 49, on which the sliding or the breakage of the membrane corresponds to the point 50 of the ordinate P4 + P5.

But after a stroke 44, in the order of 0.5mm, for example, a breaking part 45 fast with the piston 31 abuts against the guide 46 fast with the support 25. The shearing of the breaking part alone occurs for an effort corresponding to a pressure P2 exerted on the cross-section of the piston 31; P2 is in the order of 200 ± 50 mbars for example. On the device being in operating condition, when the piston has finished the stroke 44, and taking into account the total spring biasing force component acting against the piston 2 F2, the shearing of the breaking part 45 will occur for a pressure P3 = P1 + P2.

If the pressure P4 + P5 is less than P3, the membrane 29 will slide between two opposed compression fixing surfaces for one edge or peripheral portion or break independently from its own characteristics, as soon as the piston has crossed the threshold or center position of the overcenter spring mechanism and experienced a movement corresponding to the stroke 44.

For each device, the pressure P1 is adjusted accurately for example by a measuring of the pressure when the point at which the piston comes apart from the fixed part is referenced with a comparator installed on the mobile part.

As P2 is small in relation to P1, the tolerance on the operating pressure P3 makes a large tolerance on the pressure valve charge corresponding to the shearing of the breaking part 45 possible and hence makes manufacturing easier while representing only a slight relative tolerance on the adjustment pressure of the device. For example, for an operating pressure in the tank of 4 bars, a pressure P2 of 200 mbars corresponding to the shearing of the breaking part with a tolerance of ± 50 mbars, a relative tolerance of ±25% on the shearing of the breaking part and a relative tolerance of ± 1.25% on the operating pressure of the device are obtained.

Although the devices which have just been described appear to afford the greatest advantages for implementing the invention, it will be understood that various modifications may be made thereto without going beyond the scope of the invention, it being possible to replace certain elements by others capable of fulfilling the same equivalent technical function.

We claim:

1. In a device for dissipating the accidental over-pressure of a fluid container in an enclosure provided with a fluid-tight membrane which moves in response to the over-pressure to vent the container, the improvement comprising: a mobile piston mounted for movement adjacent the membrane and positioned on the opposite side of the membrane from the fluid and retaining the membrane against the action of the pressure of the fluid and an overcenter spring mechanism operatively associated with said piston including a spring and having a threshold of balance such that in a first state relative to the threshold of balance it applies a spring biasing force to the piston in opposition to the action of the pressure of the fluid, and which in the event of an over-pressure of the fluid, is actuated by the piston to the extent that it reaches its threshold of balance and passes into a second state relative to the threshold of balance where the spring biasing force acts in the same direction as the fluid pressure to release the piston from said membrane and permits movement of said membrane to vent the container, said mechanism comprising a set of connecting rods and levers arranged between the spring and the piston and a breaking part fixedly mounted with respect to said container and resisting piston movement in the direction away from said membrane and wherein the threshold of balance corresponds to the position of the piston which causes the breaking of said breaking part to permit the fluid-tight membrane to move to a position venting said container.

2. The device according to claim 1, wherein: the force applied to the piston due to the action of the spring and transmitted by the mechanism decreases as the piston moves towards container vent position from the point where the breaking part breaks.

3. In a device for dissipating the accidental over-pressure of a fluid container in an enclosure provided with a fluid-tight membrane which moves in response to the over-pressure to vent the container, the improvement comprising: a mobile piston mounted for movement adjacent the membrane and on the side of the membrane opposite from the fluid and retaining the membrane against the action of the pressure of the fluid, an overcenter spring mechanism operatively coupled to said piston and having a threshold of balance such that in a first state relative to the threshold of balance it applies a spring force to the piston in opposition to the action of the pressure of the fluid and which in the event of over-pressure of the fluid is actuated by the piston to the extent that it reaches its overcenter position as the threshold of balance and moves suddenly to release the piston from the membrane and permit movement of the membrane to open the container, a breaking part fixedly mounted relative to said container and resisting piston movement in the opening direction and being operatively positioned with respect to said moving piston such that the resultant force acting on the piston in opposition to the fluid pressure at the time sudden movement of the membrane just past the overcenter position of the mechanism is less than the resultant force acting on the piston at the time of shearing of the breaking part.

* * * * *